United States Patent
Goldstein et al.

(10) Patent No.: US 10,199,906 B2
(45) Date of Patent: Feb. 5, 2019

(54) LIGHTWEIGHT ROTOR ENDPLATE FOR ELECTRIC MACHINE

(71) Applicant: Ford Global Technologies, LLC, Dearborn, MI (US)

(72) Inventors: Cyrille Goldstein, Dearborn, MI (US); Joel Hetrick, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 216 days.

(21) Appl. No.: 15/419,279

(22) Filed: Jan. 30, 2017

(65) Prior Publication Data
US 2018/0219455 A1    Aug. 2, 2018

(51) Int. Cl.
| | | |
|---|---|---|
| *H02K 5/00* | (2006.01) | |
| *H02K 9/19* | (2006.01) | |
| *H02K 5/15* | (2006.01) | |
| *H02K 5/20* | (2006.01) | |
| *B60L 1/00* | (2006.01) | |
| *H02K 1/32* | (2006.01) | |
| *H02K 7/00* | (2006.01) | |
| *H02K 7/116* | (2006.01) | |
| *H02K 15/00* | (2006.01) | |
| *H02K 7/04* | (2006.01) | |

(52) U.S. Cl.
CPC .................. *H02K 9/19* (2013.01); *B60L 1/00* (2013.01); *H02K 1/32* (2013.01); *H02K 5/15* (2013.01); *H02K 5/20* (2013.01); *H02K 7/006* (2013.01); *H02K 7/116* (2013.01); *H02K 15/00* (2013.01); *H02K 7/04* (2013.01)

(58) Field of Classification Search
CPC .. H02K 9/19; H02K 1/32; H02K 5/15; H02K 5/20; H02K 7/006; H02K 7/116; H02K 15/00; H02K 7/04; B60L 1/00
USPC ...................................... 310/89–90, 400–433
See application file for complete search history.

(56) References Cited

U.S. PATENT DOCUMENTS

| | | | |
|---|---|---|---|
| 7,126,242 B2 | 10/2006 | Williams et al. | |
| 7,723,887 B2 | 5/2010 | Yang et al. | |
| 8,482,173 B2* | 7/2013 | Wright ................... | F04D 13/06 310/400 |
| 8,710,707 B2* | 4/2014 | Lau .......................... | H02K 5/15 310/411 |
| 8,749,110 B2* | 6/2014 | Wong ...................... | H02K 1/17 310/154.22 |
| 2009/0315423 A1* | 12/2009 | Suzuki ................... | H02K 1/276 310/156.12 |
| 2016/0079817 A1 | 3/2016 | Hayashi et al. | |
| 2018/0278126 A1* | 9/2018 | Goldstein .............. | H02K 9/193 |

* cited by examiner

*Primary Examiner* — Thanh Lam
(74) *Attorney, Agent, or Firm* — David Kelley; Brooks Kushman, P.C.

(57) ABSTRACT

An electric machine is disclosed. The electric machine may include a rotor and an endplate. The endplate may define an aperture, an inner locknut surface and a balance-ring surface. The locknut surface may extend from a periphery of the aperture to a first diameter. The balance-ring surface may extend from a second diameter that is greater than the first diameter to an outer periphery of the endplate. Before assembly, the balance-ring surface may be adjacent to the rotor and the locknut surface may be spaced apart from the rotor.

20 Claims, 4 Drawing Sheets

LIGHTWEIGHT ROTOR ENDPLATE FOR ELECTRIC MACHINE

TECHNICAL FIELD

The present disclosure relates to electric machines, for use with electric and hybrid-electric vehicles, capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, an electric machine may include a rotor and an endplate. The endplate may define an aperture, an inner locknut surface and a balance-ring surface. The locknut surface may extend from a periphery of the aperture to a first diameter. The balance-ring surface may extend from a second diameter that is greater than the first diameter to an outer periphery of the endplate. Before assembly, the balance-ring surface may be adjacent to the rotor and the locknut surface may be spaced apart from the rotor.

According to another embodiment, an electric machine may include a rotor, a stator that circumferentially surrounds the rotor, and a rotor endplate. The rotor endplate preferably defines a center mounting hole, a locknut-surface ring and a balance-ring surface. The locknut-surface ring may extend from a periphery of the center mounting hole to a first diameter. The balance-ring surface may extend from a second diameter that is larger than the first diameter, and an outer periphery of the rotor endplate. The locknut-surface ring may define a plane and the balance-ring surface may define another plane. The plane defined by the lock-nut surface ring is preferably spaced apart from the plane defined by the balance-ring surface.

According to yet another embodiment, an electric machine is disclosed. The electric machine preferably includes a stack of laminations defining a rotor mounted on a shaft, a locknut, and an endplate. The endplate may define a balance ring, a locknut surface and a plurality of reinforcement ribs defined by an area between the balance ring and the locknut surface. The balance ring preferably defines a plane and a locknut surface defines a plane. The plane defined by the balance ring and the plane defined by the locknut surface may be in a non-coplanar relationship. The locknut surface of the convex endplate may be configured to deform to the rotor as the locknut is tightened.

BRIEF DESCRIPTION OF THE DRAWINGS

FIG. 2-A is a side view, in cross section, of a portion of an example electric machine taken along the cross-sectional line 2-A in FIG. 2.

DETAILED DESCRIPTION

Figure 1:
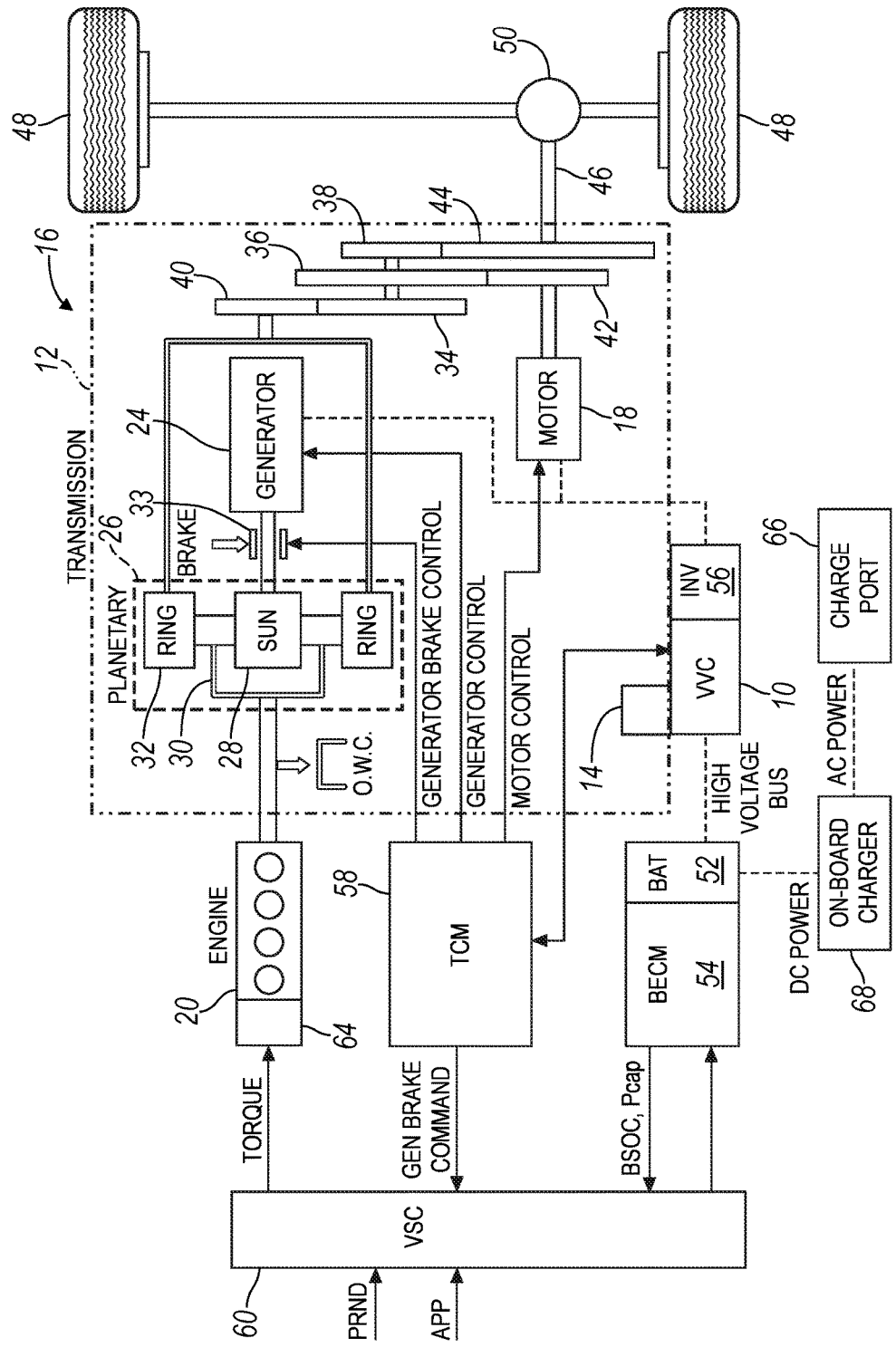
FIG. 1 is a schematic diagram of an example hybrid vehicle according to one embodiment of this disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention Referring to FIG. 1, an example plugin-hybrid-electric vehicle (PHEV) is depicted and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2A:
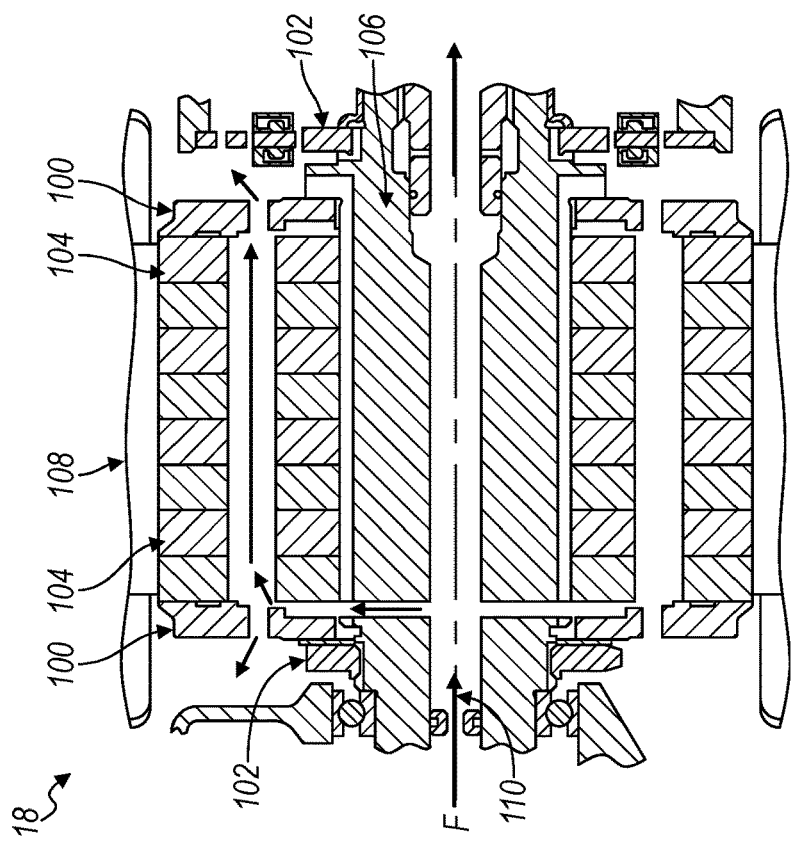
FIG. 2 is a perspective view of an example electric motor according to one embodiment of this disclosure.
Figure 2:
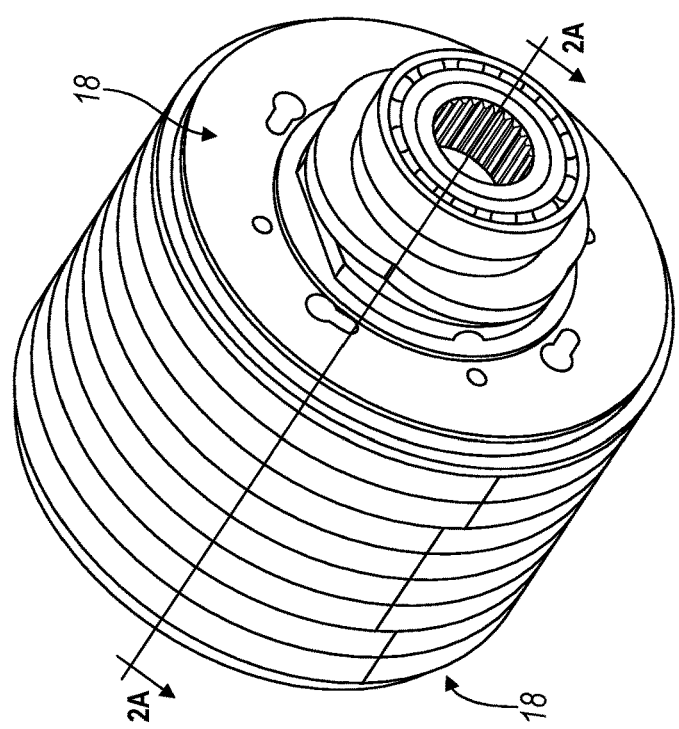

Referring to FIGS. 2 and 2-A, an electric machine 18 is illustrated. The electric machine 18 includes two endplates 100 disposed on either side of the rotor 104. The rotor 104 is made up of a stack of laminations. To clamp and hold the stack of laminations in place, a locknut 102 is fastened to a shaft 106 so that the endplate 100 clamps both ends of the rotor 104. Because the rotor is comprised of a stack of laminations, it is preferable to provide a clamping force over a majority of the surface area of the rotor face. The distribution of clamping force distributed by the endplate 100 over the surface area of the rotor 104 will be described in greater detail below.

The shaft 106 is operatively coupled to the gearbox (not shown). When current is supplied to the stator 108, a magnetic field is created causing the rotor 104 to spin within the stator 108. This rotation generates a torque that is supplied to the gearbox via one or more shafts. During operation, the electric machine 18 generates heat within the rotor 104 and the stator 108. To prevent overheating of the electric machine, a fluid circuit may be provided to remove heat generated during operation. To cool the electric machine 18, fluid flows through a hollow portion 110 of the shaft 106 and along the directional arrow F.

Figure 3:
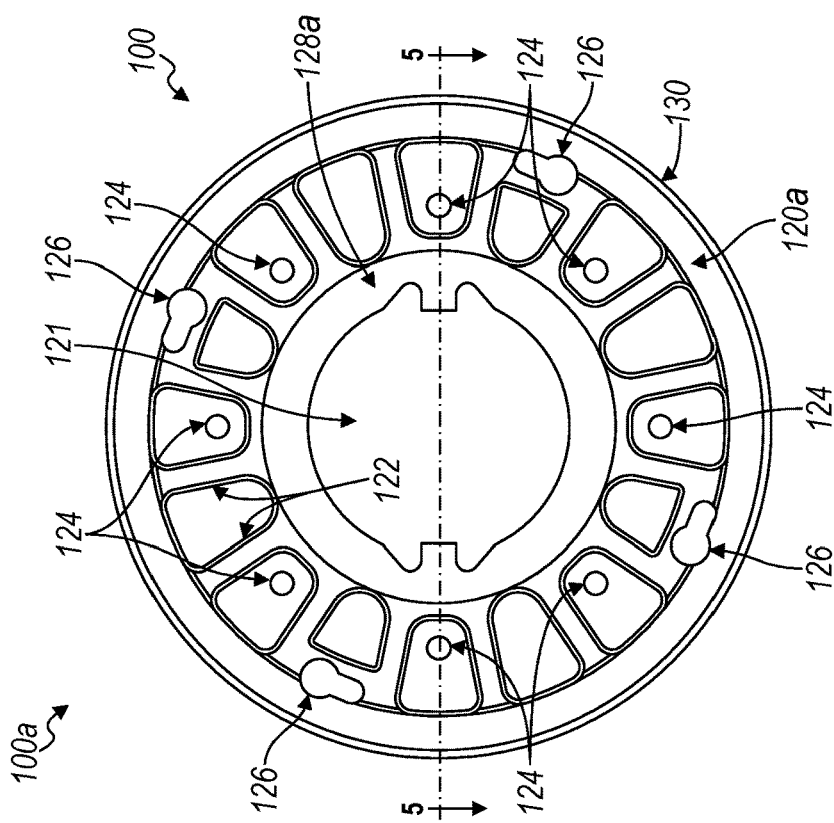
FIG. 3 is a front plan view of a rotor endplate according to one embodiment of this disclosure.

Referring to FIG. 3, the front face 100A of a rotor endplate 100 is illustrated. The rotor endplate 100 is a circular disk. A balance ring 120 defines the outer periphery 130 of the endplate 100. The balance ring 120 has two sides, an outer side 120a and a pressure application surface 120b. When assembled, the pressure application surface 120b of the balance ring 120 is disposed adjacent to the rotor. Four assembly lift points 126 are disposed within the endplate 100 and the balance ring 120. The assembly lift points 126 facilitate picking and placing the electric machine within the transmission (not shown) during assembly. Cooling holes 124 are circumferentially arranged about the center of the rotor endplate 100. The cooling holes 124 are sized and placed so that as the level of fluid within the electric machine increases, some fluid is permitted to move through the endplate to cool the rotor. A locking area 128 is disposed between the center hole 121 and a number of reinforcement ribs 122. The locking area 128 has two sides, an outer locknut surface 128a and an inner locknut surface 128b. The inner locknut surface 128b may also be referred to as a pressure application surface or clamping surface. When assembled, the inner locknut surface or pressure application surface 128b is disposed adjacent to the rotor. The outer locknut surface 128a is the area where the locknut 102 comes into contact with the endplate when tightened. Preferably, the reinforcement ribs have a rectangular shape with rounded corners. The reinforcement ribs provide a larger cross-sectional area as compared to a relatively flat piece of material, so that the material is less susceptible to yielding under load. Because reinforcement ribs provide additional strength as compared to an endplate without reinforcement ribs, thinner material may be used. One advantage of using a thinner material is reducing cost and weight associated with electric machine endplates.

Figure 4:
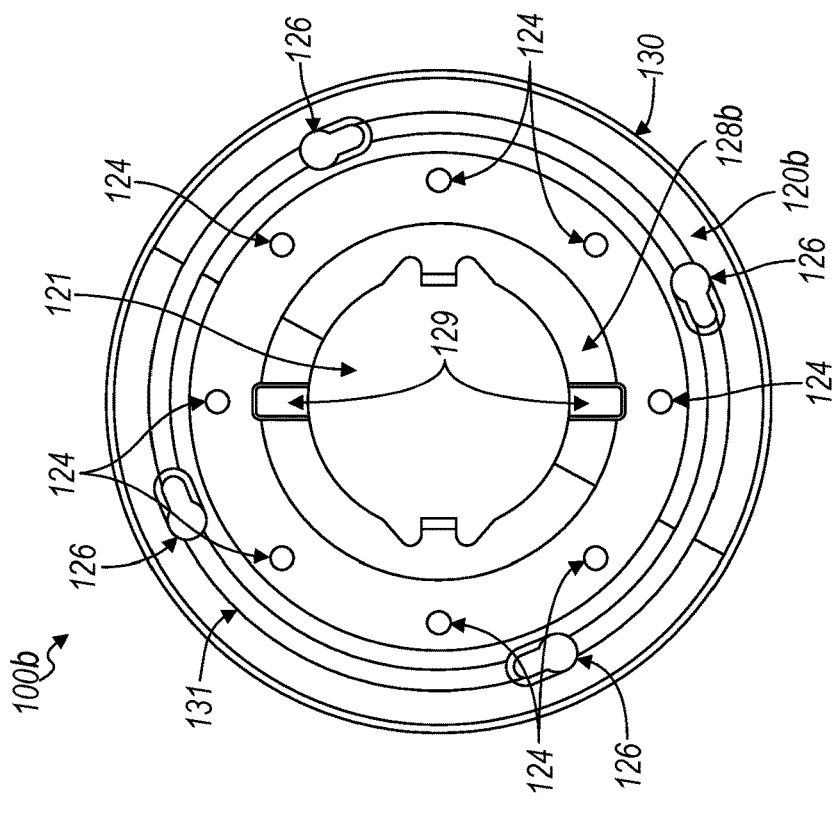
FIG. 4 is a rear plan view of a rotor endplate according to one embodiment of this disclosure.

Referring to FIG. 4, the rear face 100B of a rotor endplate 100 is illustrated. Two cooling slots 129 are disposed adjacent to the center hole 121. The cooling slots 129 may be referred to as trough or track and are formed by narrow depressions that include a bottom surface and at least two walls extend from the bottom surface. The cooling channel 129 disposed on the rear side of the endplate 100 facilitates outward flow of fluid from the hollow portion 110 of the shaft 106 to the outer portions of the rotor 104, as illustrated in FIG. 2.

Figure 5:
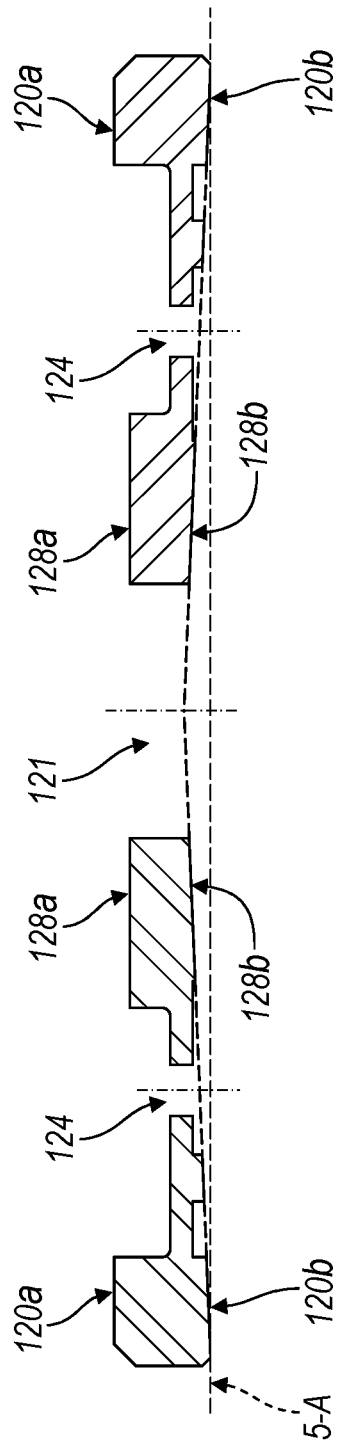
FIG. 5 is a side view, in cross-section, of a rotor endplate taken along the line 5-A in FIG. 3.

Referring to FIG. 5, a cross-sectional side view of the endplate 100 is illustrated. As can be seen from FIG. 5, before assembly, the rotor endplate 100 has a domed or convex shape. The rear surface is closest to the dotted line 5-A and is convex with respect to the line. More specifically, the pressure application surface or inner locknut surface 128b is angled away from line 5-A The amount of concavity can be measured by placing the endplate on flat surface, e.g. measuring table or other suitable surface, and measuring the gap between the flat surface and the pressure application surface 128b. The angle between the pressure application surface 128b and the pressure applicant surface 120b of the balance ring 120 may be between 0.1° and 5°, but preferably the angle is 2° During assembly, the endplate 100 is positioned on the shaft 106 adjacent to the rotor 104. To clamp the stack of laminations defining the rotor, it is preferable to exert clamping force at the balance ring 120 of the endplate 100 as well as the pressure application surface 128b. Because the rotor endplate is convex or domed, forces associated with tightening the locknut to secure the endplate are more easily distributed throughout the surface of the rotor. Before tightening the locknut 102 along the shaft 106, the balance ring 120 is adjacent to the rotor 104. As the locknut 102 moves along the shaft 106, the locknut surface 128a and the inner locknut surface or pressure application surface 128b begins to deform until it comes into contact with the rotor 104.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
a rotor; and
an endplate defining an aperture, an inner-locknut surface and a balance-ring surface, wherein the locknut surface extends from a periphery of the aperture to a first diameter, the balance-ring surface extends from a second diameter, larger than the first, to an outer periphery of the endplate, and before assembly, the balance-ring surface is adjacent to the rotor and the locknut surface is spaced apart from the rotor.

2. The electric machine of claim 1, wherein the balance-ring surface and the inner-locknut surface each define a plane, each plane is transverse to an axis of rotation defined by the rotor, and the plane defined by the balance-ring surface and the plane defined by the inner locknut surface are non-coplanar.

3. The electric machine of claim 2, further comprising a shaft and a locknut, wherein the rotor and the locknut are each attached to the shaft and are arranged so that the endplate is sandwiched between the locknut and the rotor, and as the locknut is tightened the inner-locknut surface deforms until the inner locknut surface is adjacent to the rotor.

4. The electric machine of claim 3, wherein the locknut clamps the endplate after pressing the locknut along the shaft to clamp the endplate against the rotor.

5. The electric machine of claim 3, wherein the non-coplanar inner-locknut surface and balance-ring surface are configured to distribute a clamping force associated with tightening the locknut.

6. The electric machine of claim 5, wherein the clamping force is distributed between a rotational axis of the rotor and a portion near an outer periphery of the rotor.

7. The electric machine of claim 1, wherein before assembly the endplate is convex with respect to the rotor.

8. The electric machine of claim 1, wherein the endplate has a front face and a rear face, the rear face is adjacent and closest to the rotor, and the rear face defines at least two coolant troughs that extend radially outwardly from the center.

9. The electric machine of claim 1, wherein the endplate defines a plurality of reinforcement ribs radially arranged about the aperture so that the endplate defines a larger cross-sectional area than a rotor endplate being flat.

10. The electric machine of claim 9, wherein each of the plurality of reinforcement ribs has a wider portion and a thinner portion, and the reinforcement ribs are radially arranged about the center of the endplate such that the thinner portion of each of the reinforcement ribs is positioned closest to the center.

11. An electric machine comprising:
   a rotor;
   a stator circumferentially surrounding the rotor; and
   a rotor endplate defining a center mounting hole, a locknut-surface ring and a balance-ring surface, wherein the locknut-surface ring extends from a periphery of the center mounting hole to a first diameter, the balance-ring surface extends between a second diameter, larger than the first, and an outer periphery of the rotor endplate, the locknut-surface ring defines a plane and the balance-ring surface defines a plane, and the plane defined by the lock-nut surface ring is spaced apart from the plane defined by the balance-ring surface.

12. The electric machine of claim 11, further comprising a locknut and a shaft, wherein the rotor and the locknut are each disposed on the shaft and arranged so that the endplate is sandwiched between rotor and the locknut, and as the locknut is fastened the lock-nut surface ring is deformed towards the rotor.

13. The electric machine of claim 11, wherein before assembly the endplate is convex with respect to the rotor.

14. The electric machine of claim 11, wherein the locknut-surface ring and the balance-ring surface are non-coplanar so that the locknut-surface ring deforms towards the rotor so clamping force associated with tightening the locknut against the endplate is distributed.

15. The electric machine of claim 11, wherein the non-coplanar locknut surface and balance-ring surface are configured to distribute a clamping force associated with tightening the locknut.

16. The electric machine of claim 11, wherein the endplate has a front face and a rear face, the rear face is adjacent and closest to the rotor, the rear face defines at least two coolant troughs that extend radially outwardly from the center, the cooling troughs are defined by a recessed portion having at least two wall members extending from the center mounting hole, and the coolant troughs are configured to facilitate a flow of fluid from a shaft to the outer periphery of the endplate.

17. An electric machine comprising:
   a stack of laminations defining a rotor mounted on a shaft;
   a locknut; and
   an endplate defining a balance ring, a locknut surface and a plurality of reinforcement ribs defined by an area between the balance ring and the locknut surface, wherein the balance ring defines a plane and the locknut surface defines a plane, the plane defined by the balance ring and the plane defined by the locknut surface are in a non-coplanar relationship, and the locknut surface of the endplate is configured to deform to the rotor as the locknut is tightened.

18. The electric machine of claim 17, wherein the non-coplanar relationship of the plane defined by the balance ring and the plane defined by the locknut surface is configured to distribute clamping force associated with the locknut and the endplate.

19. The electric machine of claim 18, wherein the balance ring defines a plurality of apertures circumferentially distributed around the balance ring, and the apertures include a round portion and a slot portion that provide a lifting point for assembly tooling to engage the endplate to assemble the electric machine within a transmission.

20. The electric machine of claim 18, wherein the non-coplanar relationship defined by the plane associated with the balance ring and the plane associated with the locknut surface cooperate with the reinforcement ribs to distribute clamping force associated with the locknut and the endplate.

\* \* \* \* \*